(12) United States Patent
Wolfe et al.

(10) Patent No.: US 8,286,400 B1
(45) Date of Patent: Oct. 16, 2012

(54) SELF COOLING PANEL

(75) Inventors: Ronald D. Wolfe, Wichita, KS (US); Brent W. Staver, Wichita, KS (US); Kelly W. Berreth, Wichita, KS (US)

(73) Assignee: Wolfe Electric, Inc., Wichita, KS (US)

( * ) Notice: Subject to any disclaimer, the term of this patent is extended or adjusted under 35 U.S.C. 154(b) by 265 days.

(21) Appl. No.: 12/696,579

(22) Filed: Jan. 29, 2010

(51) Int. Cl.
*E06B 7/08* (2006.01)

(52) U.S. Cl. .......................................... 52/473; 52/478

(58) Field of Classification Search .............. 52/473, 52/478, 763, 506.09, 506.1, 588.1
See application file for complete search history.

(56) References Cited

U.S. PATENT DOCUMENTS

| | | | |
|---|---|---|---|
| 3,368,802 A | 2/1968 | Morgan et al. | |
| 3,515,052 A | 6/1970 | Brandes | |
| 4,311,460 A | 1/1982 | Lauersdorf et al. | |
| 4,715,153 A | 12/1987 | Rohrman | |
| 5,285,609 A * | 2/1994 | Goad | 52/588.1 |
| 5,673,524 A * | 10/1997 | Gailey | 52/309.9 |
| 5,875,603 A | 3/1999 | Rudd | |
| 5,878,543 A * | 3/1999 | Mowery | 52/519 |
| 5,938,274 A * | 8/1999 | Ehrlich | 296/191 |
| 6,370,832 B1 * | 4/2002 | McGarry et al. | 52/520 |
| 6,988,345 B1 * | 1/2006 | Pelfrey et al. | 52/519 |
| 7,051,485 B2 * | 5/2006 | Burnette | 52/578 |
| 7,698,865 B2 * | 4/2010 | Pringle et al. | 52/520 |
| 2007/0261345 A1 | 11/2007 | Janka et al. | |
| 2008/0083188 A1 | 4/2008 | Swanson | |
| 2008/0264602 A1 | 10/2008 | Newberry | |

* cited by examiner

*Primary Examiner* — Basil Katcheves
(74) *Attorney, Agent, or Firm* — Kenneth H. Jack; Davis & Jack, LLC

(57) ABSTRACT

A self cooling panel having a longitudinally inner wall; a longitudinally outer wall having a first plurality of "J" plates, each plate among the first plurality of "J" plates having a stem section, an upper end, a lateral end, and an oppositely lateral end, and a vertically ported tail section; first screw and eye combinations interconnecting each plate among the first plurality of "J" plates so that the upper end of each plate's stem section is positioned at the distal end of the tail section of one of the other plates among the first plurality of "J" plates, or so that the distal end of each plate's tail section is positioned at the upper end of the stem section of one of the other plates among the first plurality of "J" plate; and second screw and eye combinations interconnecting the longitudinally inner and outer walls, the second screw and eye combinations positioning the upper end of the stem section of each plate among the first plurality of "J" plates longitudinally outwardly from the panel's longitudinally inner wall.

12 Claims, 11 Drawing Sheets

US 8,286,400 B1

SELF COOLING PANEL

FIELD OF THE INVENTION

This invention relates to panels which serve as walls or portions of walls of heated enclosures. More particularly, this invention relates to such panels which are adapted for maintaining a relatively cool outer surface temperature while experiencing heating at their inner surfaces.

BACKGROUND OF THE INVENTION

Commercial work environments often present or include walled cases, boxes or enclosures which contain and conduct heated air. Outer surfaces of such walled structures are commonly exposed to and threaten accidental burning contact with bodies of workers who are also present within the work environment. Commercial kitchen oven hoods are a representative example of such cases or enclosures. Where, for example, a commercial kitchen oven hood is subjected to prolonged use, outer surfaces of the hood often becomes heated to a temperature which may inflict flesh burns.

The instant inventive self cooling panel solves or ameliorates the worker contact and injury problem discussed above by configuring a wall panel to include the specialized assembly of "J" plates which self cools through induced convective internal air flow.

BRIEF SUMMARY OF THE INVENTION

A first structural component of the instant inventive self cooling panel comprises a longitudinally outer wall which overlies and, in combination with other structures described below, defines a cooling air conduit. The longitudinally outer wall component preferably comprises a plurality of "J" plates, the "J" being representative of a cross sectional shape of the plate. Each plate among the plurality of "J" plates preferably has a stem section with upper, lower, lateral, and oppositely lateral ends. Also, each "J" plate preferably has a tail section having proximal and distal ends, the proximal end being situated at the stem section's lower end. The stem section also has lateral and oppositely lateral ends, and a lateral dimension which is preferably co-extensive with that of the panel.

A further structural component of the instant inventive self cooling panel comprises attaching means which preferably interconnect "J" plates in a vertically extending series or chain to form and define the panel's longitudinally outer wall. The attaching means are preferably adapted for arranging the "J" plates with respect to each other in a "clinker-built" or lap jointed fashion. According to the preferred "J" plate arrangement, the upper end of the stem section of the lowermost "J" plate in the linked series is attached to the inner or distal end of the tail section of the immediately overlying "J" plate in the series. Also in the preferred arrangement, the distal end of the tail section of the uppermost "J" plate in the linked series is attached to the upper end of the stem section of the immediately underlying "J" plate in the series. In the preferred arrangement, each other "J" plate is interconnected with immediate underlying and overlying "J" plates in a stem to tail attachment chain or series. Such clinker-built plate attachment mode advantageously arranges each tail section's port to aspirate ambient room air upwardly there through and into the panel's interior cavity.

A further structural component of the instant inventive self cooling panel comprises second attaching means which preferably rigidly (and preferably releasably) interconnect the panel's longitudinally inner and longitudinally outer walls. In the preferred embodiment, the second attaching means are adapted for outwardly displacing the upper ends of the outer wall's "J" plate stem sections so that air aspirated through parts within such "J" plates' tail sections ports may continuously upwardly flow within the cavity defined between the panel's inner and outer walls.

In a preferred embodiment, the panel's longitudinally inner wall component is configured similarly with the outer wall to include a vertically extending series or chain of "J" plates. The inner wall's "J" plates preferably comprise a second plurality of plates, and such plates' tail sections are preferably oppositely oriented to extend outwardly to meet and to be attached to the distal ends of the outer wall's "J" plate tail sections. The inner wall "J" plates are preferably vertically interconnected in a "carvel-built" fashion (i.e., with stem section upper ends attached directly to stem section lower ends) so that ports which open at such plates' tail sections may vertically conduct cooling air through the interior cavity defined between the panel's inner and outer walls. Accordingly, the inner "J" plates' tail sections dually function as air conducting members and as wall spaces.

The instant inventive self cooling panel may be advantageously utilized as a section of a wall of a heated chamber or air conduit such as a commercial oven exhaust hood. As the interior of such exhaust hood is heated, the rise in temperature induces upwardly directed convection currents within the hollow cavity between the panel's inner and outer walls. The convective air flow advantageously aspirates ambient air through the air passage ports within the outer wall's "J" plates tail sections. The convective air flow through the panel's interior advantageously enhances the temperature differential between the hot air within the exhaust hood making the panel's exposed outer wall relatively cool and safe to touch. The inventive panel's preferred modular plate construction also advantageously facilitate configuration and re-configuration of the panel to suit differing applications.

Accordingly, it is an object of the instant invention to provide a self cooling panel which incorporates structures, as described above, and which arranges those structures with respect to each other in manners as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
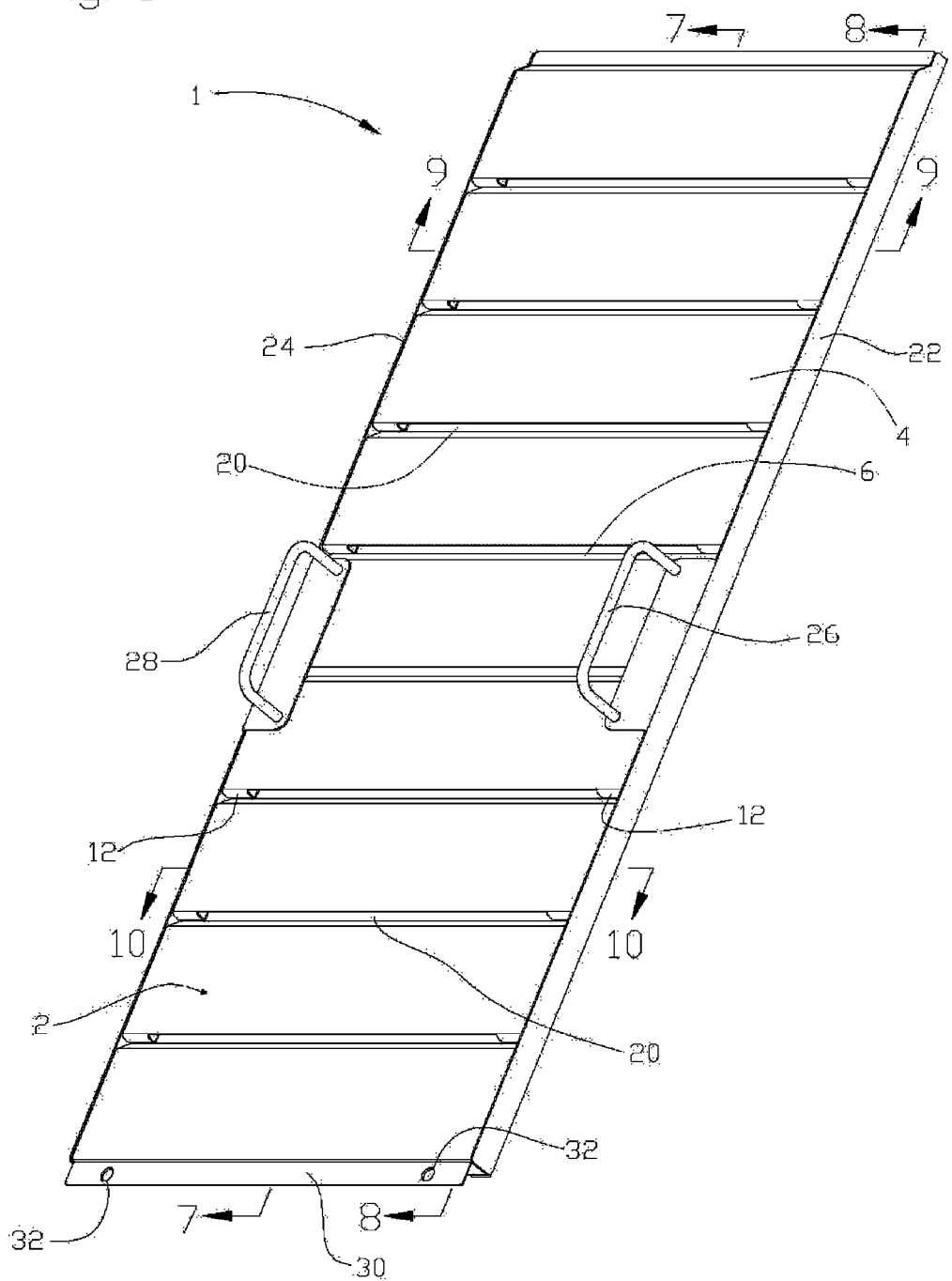
FIG. 1 is a perspective view of a preferred embodiment of the instant inventive self cooling panel.
Figure 2:
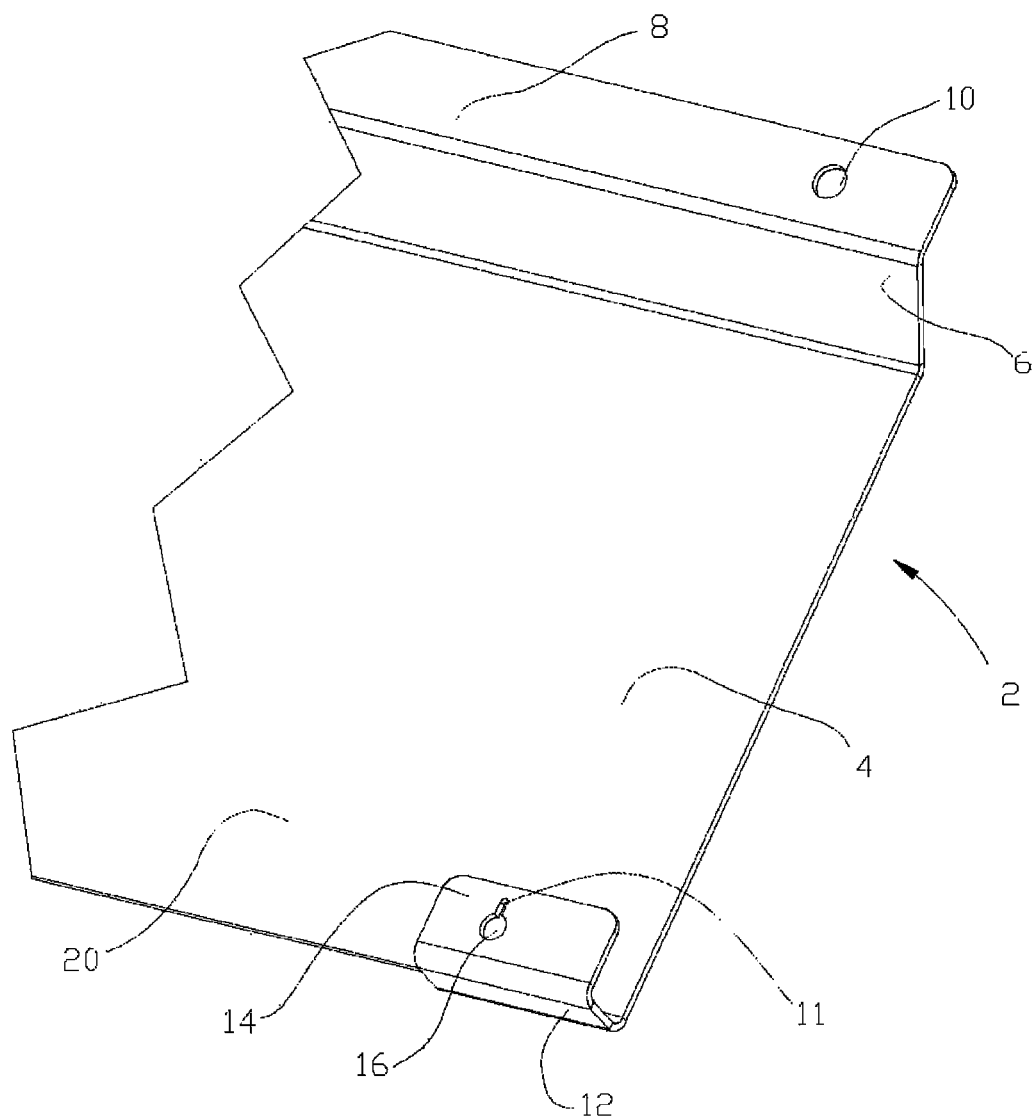
FIG. 2 is a partial view of one of the longitudinally outer "J" plate components of the instant invention.
Figure 3:
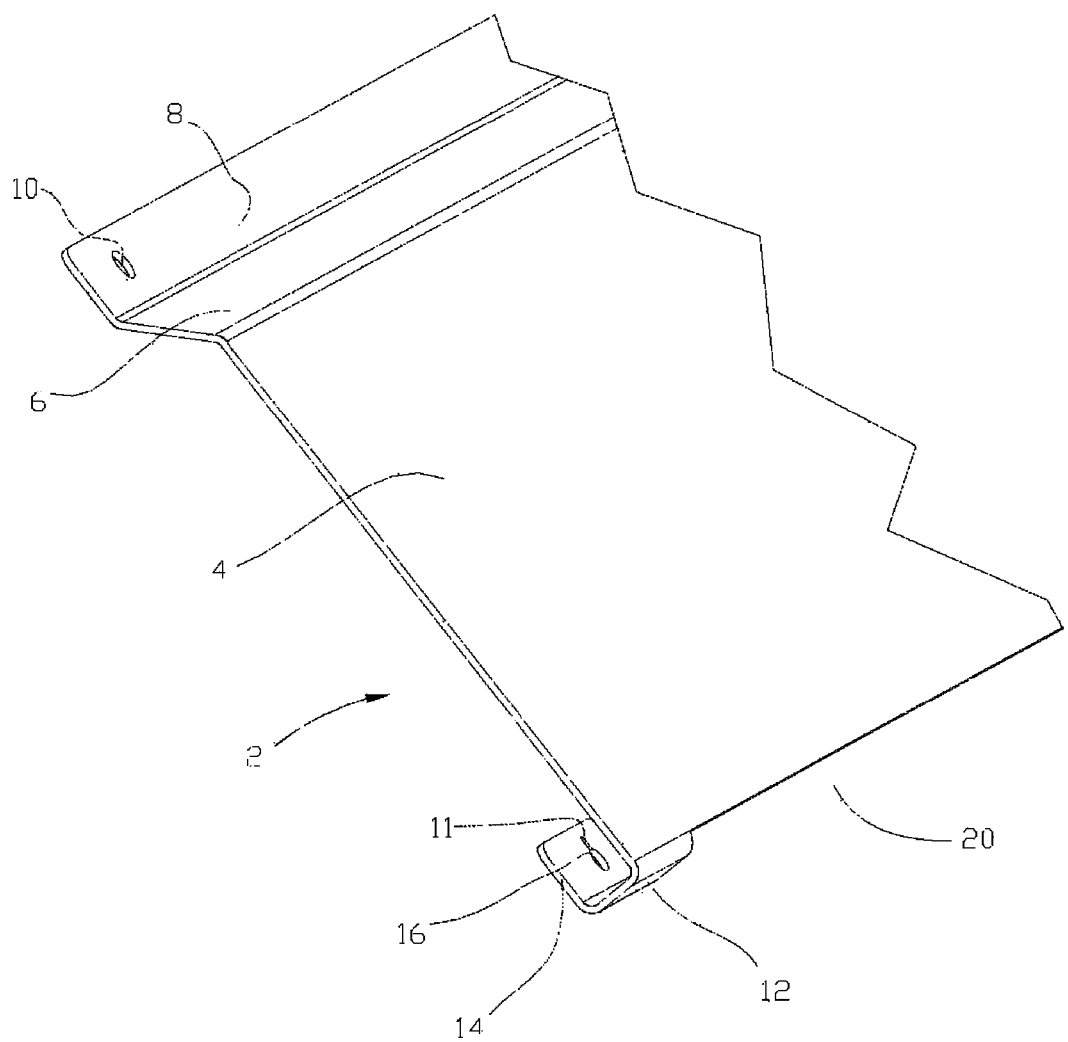
FIG. 3 presents a view of an oppositely lateral end of the "J" plate component depicted in FIG. 2.

Referring now to the drawings, and in particular to FIG. 1, a preferred embodiment of the instant inventive self cooling panel is referred to generally by Reference Arrow 1. Referring further simultaneously to FIGS. 2 and 3, one of the core structural components of the panel 1 comprises a "J" plate which is referred to generally by Reference Arrow 2. In the exemplary panel 1 depicted in FIG. 1, nine substantially identical "J" plate components 2 are provided and arranged in a vertically attached series or chain. Such "J" plate chain forms a longitudinally outer wall component of the inventive panel 1.

Referring further to FIGS. 1, 2 and 3, each of the "J" plates 2 preferably has a vertically extending stem section 4, the stem sections 4 preferably extending across the full lateral width of the panel 1. Each of the "J" plates 2 also preferably has an integrally or wholly formed tail section 12 which, like the stem sections 4, preferably span the lateral width of panel 1. (For purposes further explained below, the laterally extending tail section 12 includes an air passage port 20, such port 20 preferably being configured as an uninterrupted and laterally oblongated tail section void, such void configured port being positioned medially along the lateral span of the tail section 12.

The distal ends of the tail sections 12 of the "J" plates 2 are preferably configured to present vertically extending screw mounting lands 14. Overlying or upper screw mounting lands 8 are preferably presented at the upper ends of the stem sections 4, such upper lands 8 preferably being oriented in a substantially co-planar alignment with the lower screw mounting lands 14. Such alignment of lands 8 and 14 are, referring further to FIG. 7, preferably longitudinally offset a distance equal to the sheet metal thickness of the "J" plate 2. In the preferred embodiment, an inwardly extending chamfered or beveled section 6 of the stem 4 facilitates such alignment of lands 14 and 8. A plurality of screw receiving eyes 10 and 16 preferably respectively extends through the upper and lower screw mounting lands 8 and 14, such eyes 10 and 16 preferably being arranged in vertical alignment with each other. In order to facilitate secure threaded engagement of the eyes 16 with the longitudinally outer ends of sheet metal screws (as is further discussed below), the eyes 16 have associated relief slots 11 which allow the annuluses of the eyes 16 to flexibly extend helically upon engagement with screw threads.

Figure 4:
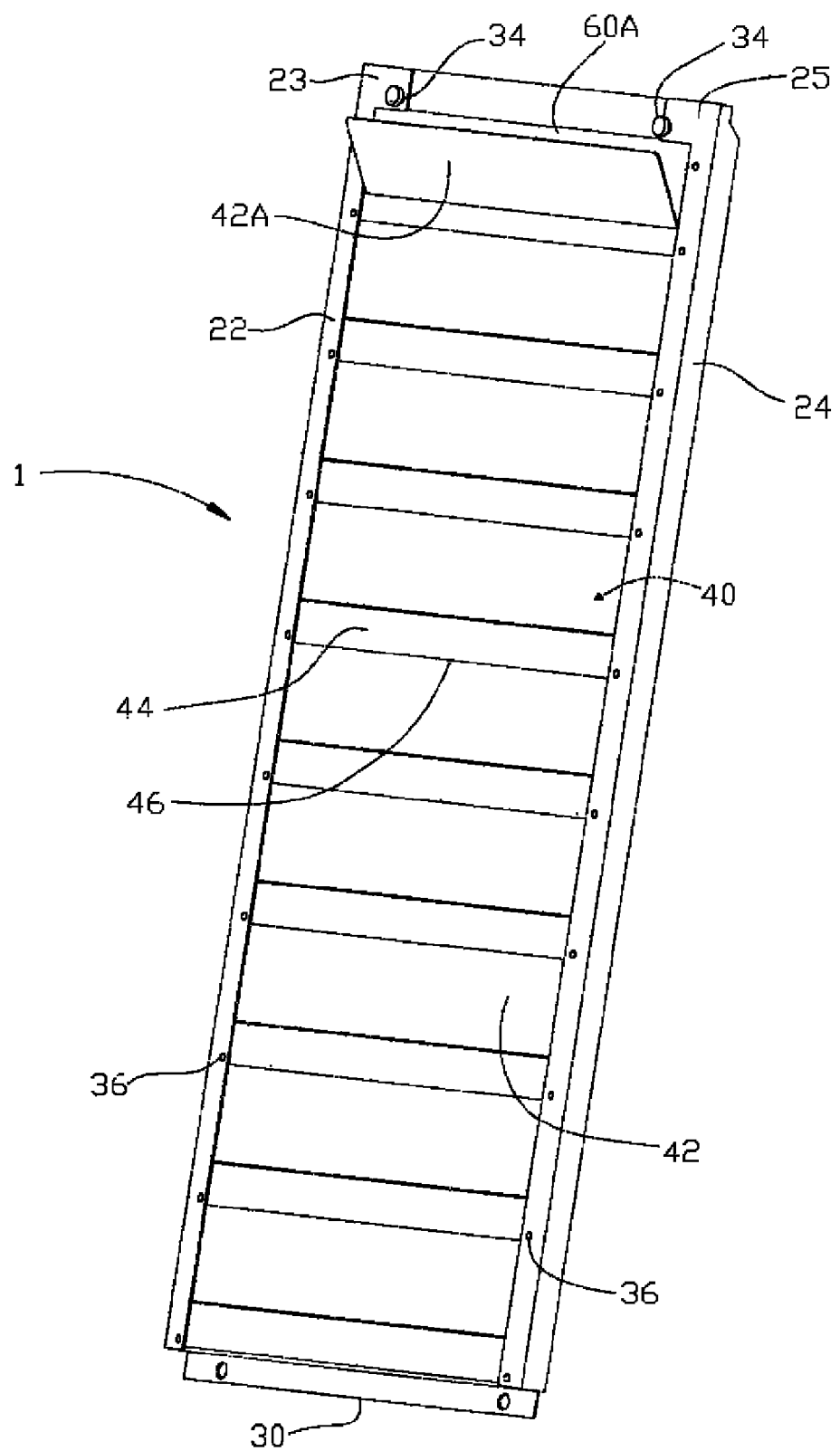
FIG. 4 presents a reverse or longitudinally inner view of the panel depicted in FIG. 1.
Figure 5:
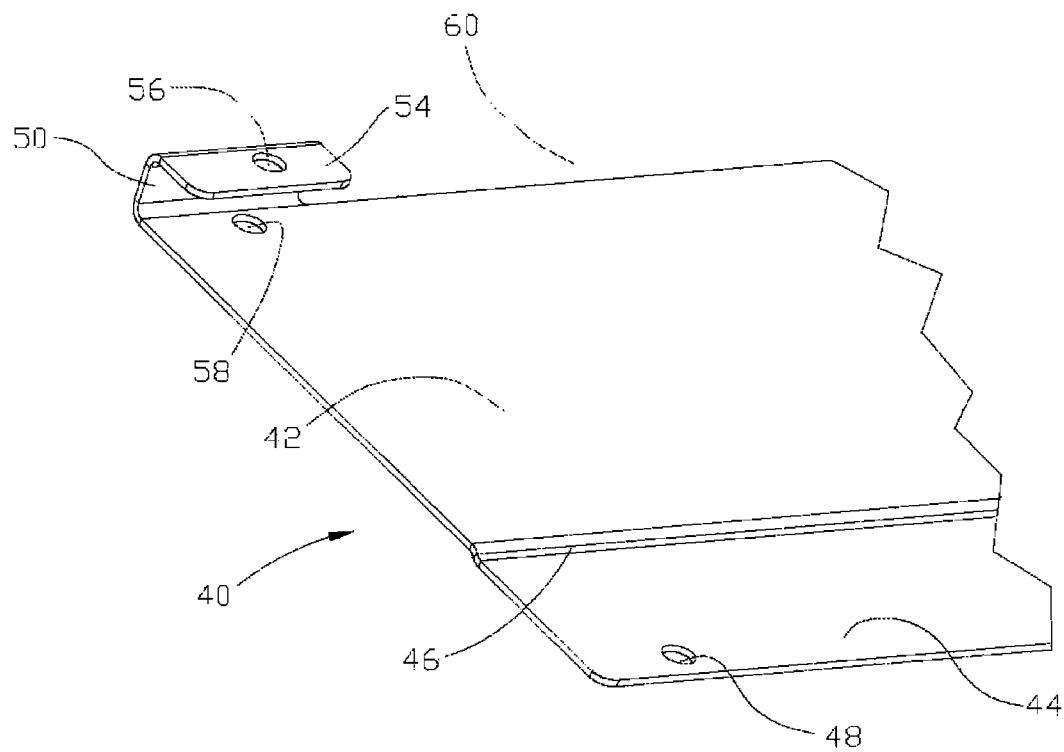
FIG. 5 presents a partial view of one of the longitudinally inner "J" plate components of the instant invention.
Figure 6:
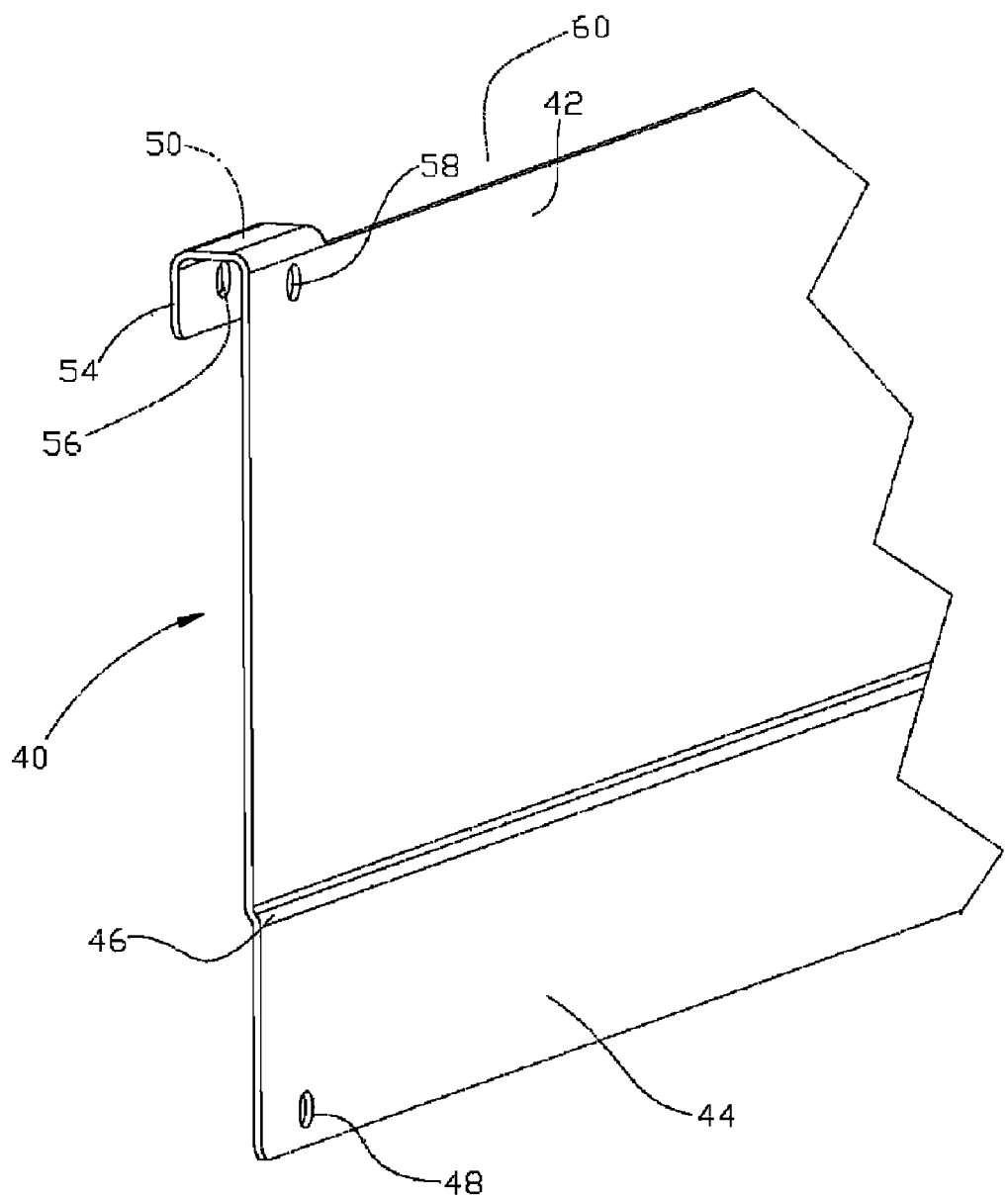
FIG. 6 presents a view of an oppositely lateral end of the "J" plate component depicted in FIG. 5.

Referring simultaneously to FIGS. 1 and 4, it can be seen that a second wall panel is situated longitudinally inwardly from the outer wall depicted in FIG. 1. In the preferred embodiment, the longitudinally inner wall comprises, like the outer wall, a vertical chain or series of plates which are referred to generally by Reference Arrow 40. Referring further simultaneously to FIGS. 5 and 6, each of the plates 40 is, like the plates 2 depicted in FIGS. 1-3, preferably configured to include a "J" shaped cross section, each "J" having a stem section 42 and a tail section 50. Similarly with the configuration of the longitudinally outer "J" plates 2, the tail sections 50 of the inner "J" plates 40 preferably have laterally oblongated ports 60, such ports preferably being configured as uninterrupted voids. The distal ends of the tail sections 50 of the "J" plates 40 preferably are configured to present vertically extending screw mounting lands 54. Each of the "J" plates 40 preferably further includes a laterally extending transition or step 46 which longitudinally offsets the end of the stem section 42 which is opposite the tail section a distance substantially equal to the plate thickness of the "J" plate 40, such offsets forming screw mounting lands 44. A second plurality of screw receiving eyes 48, 56, and 58 preferably extends through the screw mounting lands 44, the screw mounting lands 56, and through the base ends of the stem sections 42. Such plurality of eyes are preferably arranged in vertically and longitudinally aligned groups, as depicted.

Figure 8:
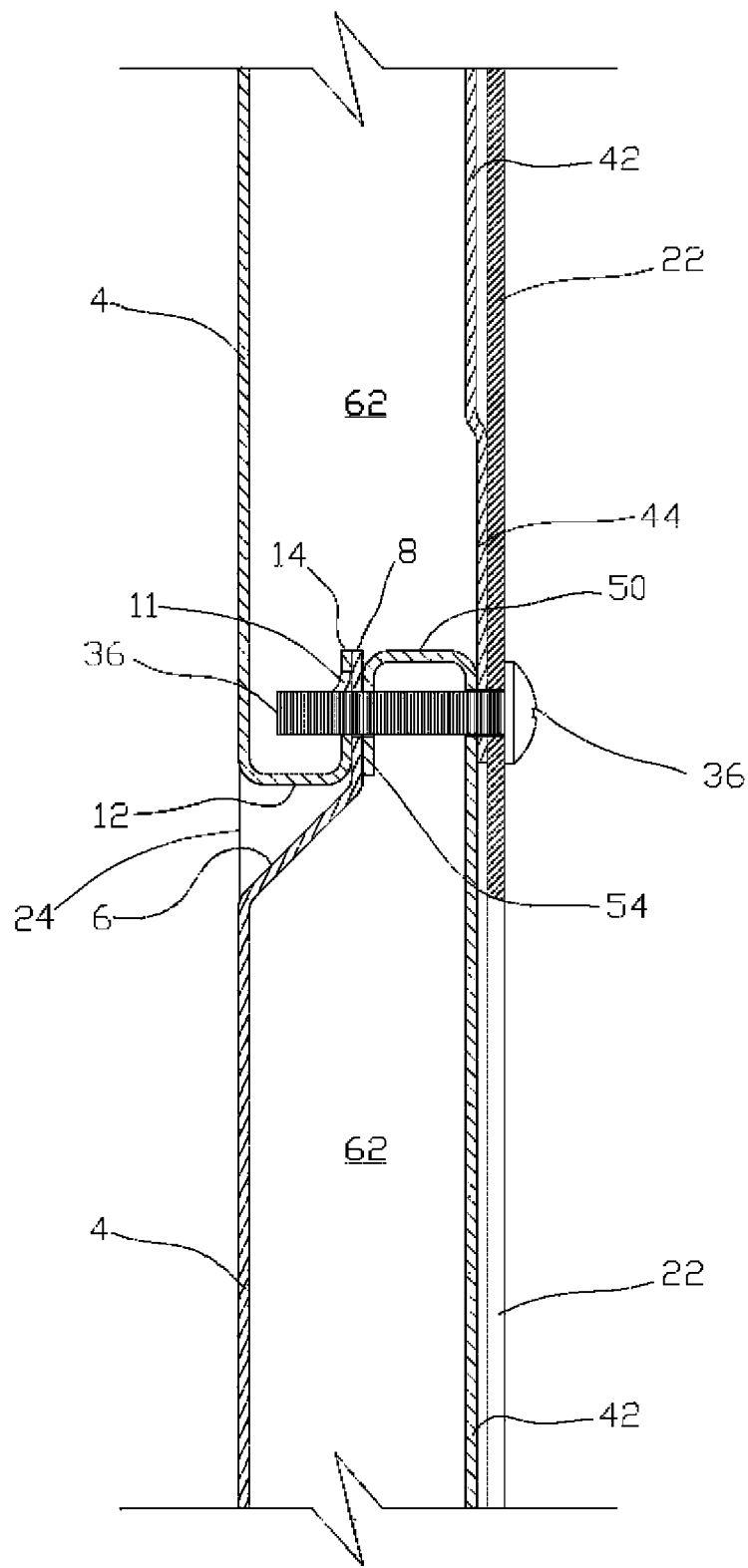
FIG. 8 is an alternative partial sectional view as indicated in FIG. 1.
Figure 9:
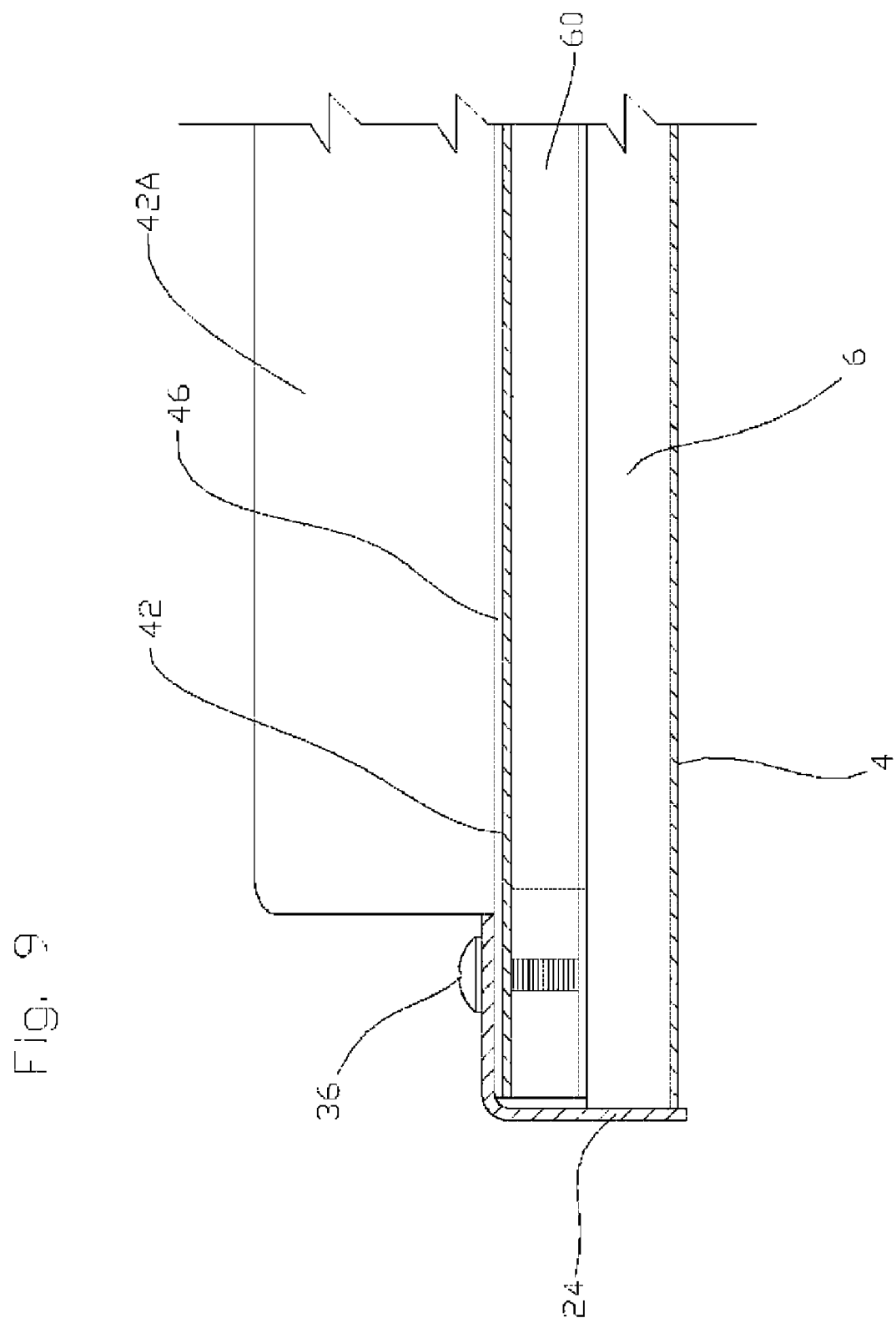
FIG. 9 is a further alternative sectional view as indicated in FIG. 1.
Figure 10:
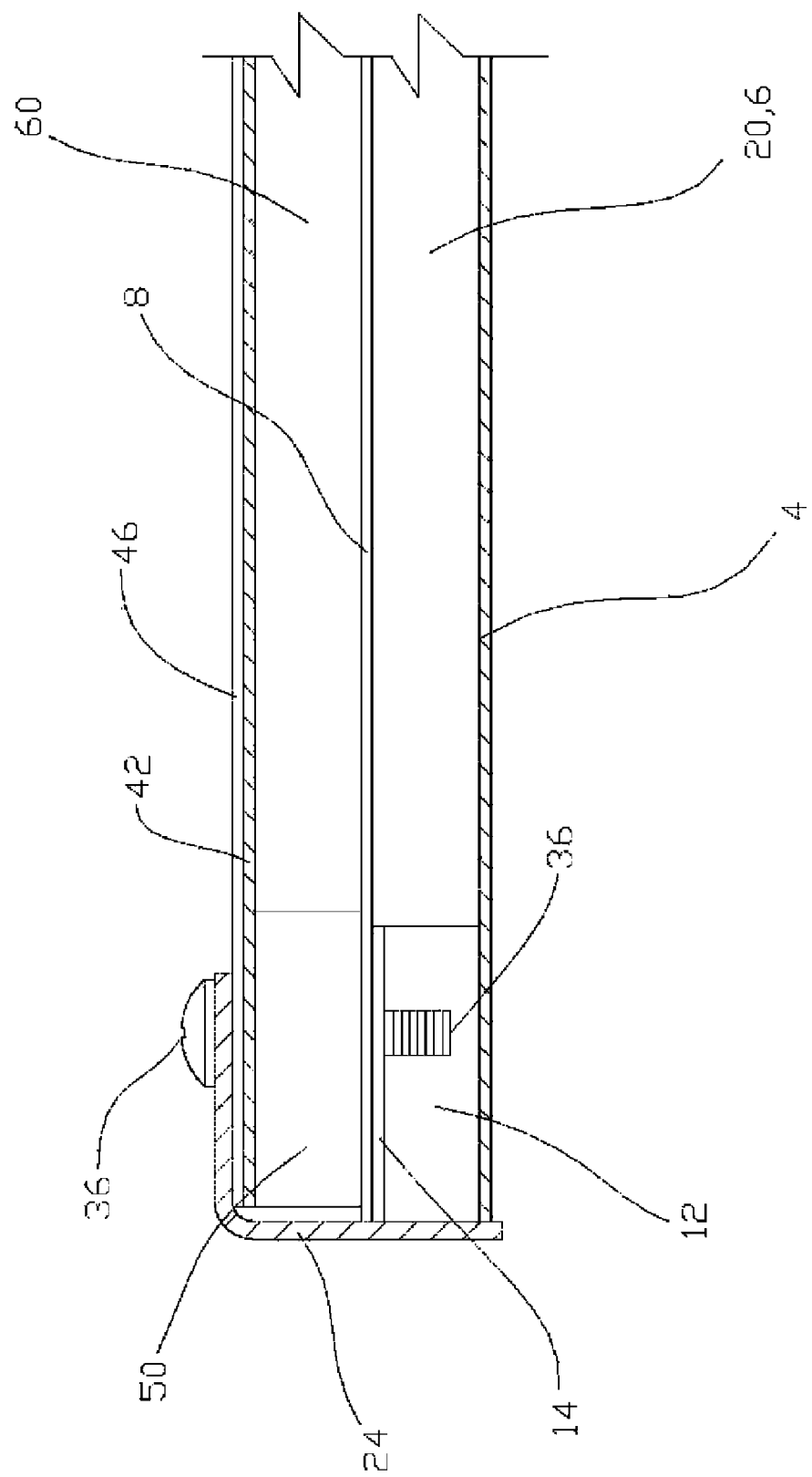
FIG. 10 is a further alternative sectional view as indicated in FIG. 1.

Referring simultaneously to FIGS. 1 and 8, first attaching means are preferably provided to interconnect the outer "J" plates 2 in the depicted outer wall forming vertically extending chain or series. Such first attaching means preferably comprise the vertically extending and substantially co-planar screw mounting lands 8 and 14 which exist at the upper ends of the stems 4 and at the distal ends of the tails 12 of the "J" plates 2. The first attaching means preferably further comprise, referring further simultaneously to FIG. 2, the plurality of screw receiving eyes 10 and 16 along with longitudinally outer ends of a plurality of screws 36 which are longitudinally outwardly extended therethrough. The mounting land, screw eye, and screw combinations depicted in FIGS. 1, 2, and 8 constitute preferred first attaching means components due to their ease of assembly and disassembly. Notwithstanding, other commonly known means for fixedly interconnecting sheet metal lands and flanges such as rivets are considered to fall within the scope of the invention, and such alternate attaching means may be suitably substituted and utilized as first attaching means components.

Figure 7:
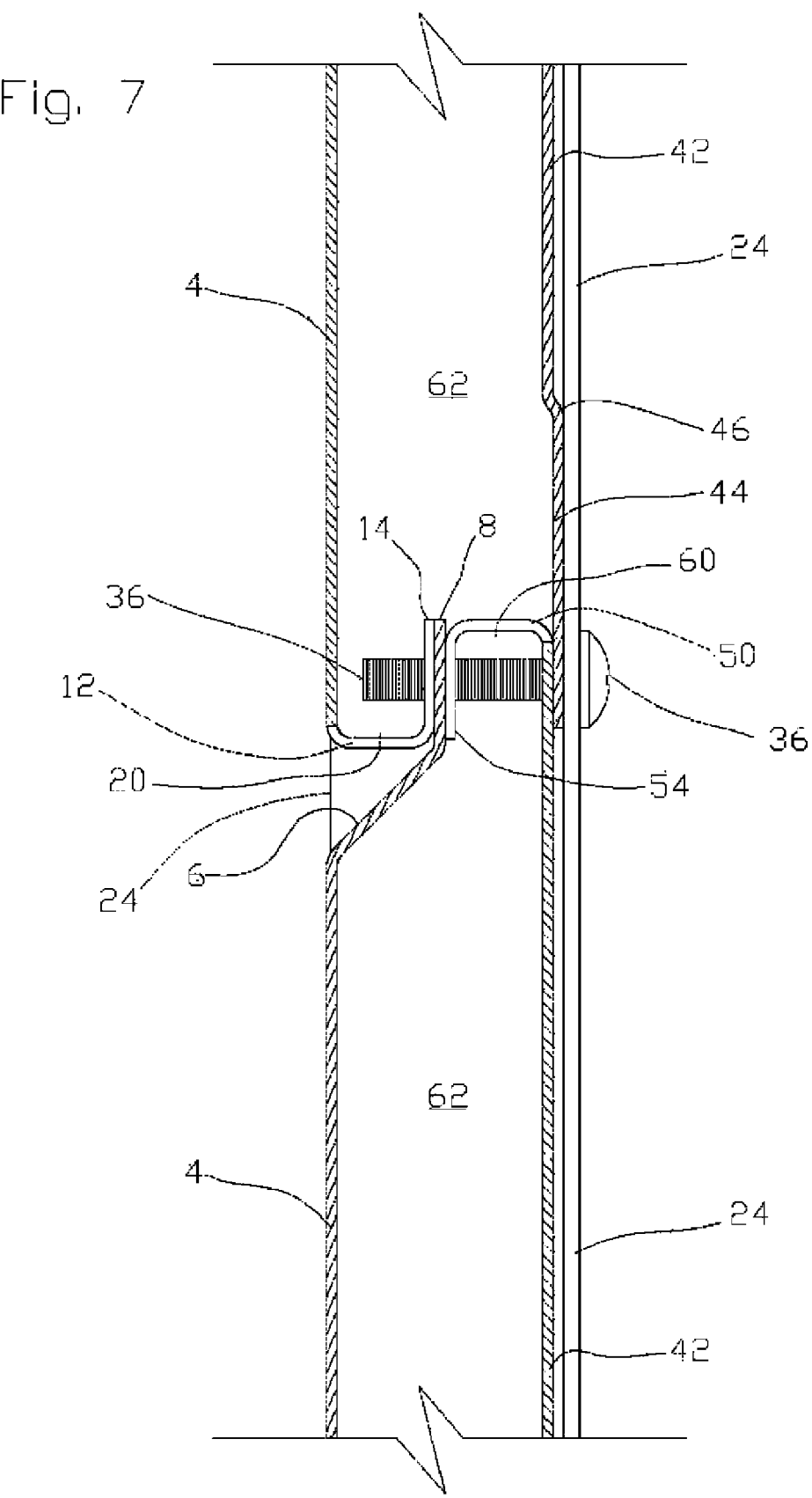
FIG. 7 is a partial sectional view as indicated in FIG. 1.

As is specifically depicted in FIG. 8, the first attaching means components of the instant inventive panel preferably interconnect the outer "J" plates in a "clinker-built" or lap jointed fashion wherein the distal ends of the "J" plates' tail sections abutt and connect with the upper ends of the "J" plates' stem sections. In the preferred clinker-built configuration, each "J" plate has at least an attachment with an immediately overlying "J" plate (with a stem to tail end connection) or an immediately underlying "J" plate (with a tail to stem connection) while the vertically intermediate "J" plates include both of such attachments. Referring further to FIG. 7, as a result of such preferred "clinker-built" or lap jointed configuration of the series of "J" plates 2, ports 20 which open at the "J" plates' tail sections 12 are advantageously longitudinally outwardly exposed for aspiration of ambient room air therethrough, such air continuing to flow into and upwardly along the panel's hollow interior cavity 62.

Referring simultaneously to FIGS. 4-8, the instant inventive panel 1 preferably further comprises second attaching means which are adapted for rigidly (and preferably releasably) interconnecting the panel's outer and inner wall components. In a preferred embodiment, the second attaching means comprise combinations of the tail sections 50 of the preferred second plurality of "J" plates 40, in combination with the second plurality of screw receiving apertures 48, 56, and 58 extending therethrough, and in further combination with the longitudinally inner ends of the screws 36. The outwardly extending "J" plate tail sections 50 advantageously dually function as screw mounting means and as wall spacers. According to the wall spacing function of the tail sections 50, upward convective air flow through the panel's interior cavities 62 is facilitated by the spacer defined gap (or port 50) existing between the screw mounting lands 8 of the outer "J" plates 2 and the longitudinally outer surface of the longitudinally inner wall.

Referring to FIGS. 1-8, it may be seen that the first and second attaching means, configured as preferred to comprise combinations of screws 36, pluralities of eyes 10, 16, 48, 56, and 58, and screw mounting lands 10, 14, 44, and 54, effectively arrange the inner and outer walls to bound and define the interior panel cavities 62 only in the longitudinal direction. In order to further laterally bound and define the interior cavities 62, end caps are preferably provided to laterally overlie and cover the lateral and oppositely lateral ends of the inner and outer pluralities of "J" plates 40 and 2. In the preferred embodiment of the inventive panel 1, such lateral and oppositely lateral end caps comprise longitudinally outwardly extending flanges of a pair of rigid "L" beams 22 and 24. The laterally extending flanges of such "L" beams 22 and 24 are preferably apertured to receive the screws 36. Accordingly, the preferred "L" beams end caps 22 and 24 advantageously dually function to lend overall structural rigidity to the panel 1, and to serve as lateral ends caps which further close and define the cooling air conducting cavities 62.

Referring to FIG. 4, the stem section 42 of the uppermost "J" plate component 40 of the inner wall of the panel 1 is preferably "U" slotted to present an inwardly deflectable section 42A. Upon longitudinally inward bending of section 42A, an upper air outlet or vent 60A is advantageously formed. Such vents 60A may serve to expel convective flows of cooling air, or such vents may communicate with negative air pressure induced by, for example, an overlying exhaust hood.

Referring simultaneously to FIGS. 1 and 7, according to the basic function of the panel 1, heat applied to the inner wall surfaces 42 and 44 of the panel 1 tends to heat air residing with cavities 62, causing such air to convectively rise and flow vertically therethrough, the heated air successively passing through the ports 60 of the "J" plates 40. Such convective vertical air flow simultaneously causes cooler outside ambient air to aspirate into and through ports 20 to mix with and cool the heated air within cavity 62, effectively cooling the outer surfaces of the panel.

Figure 11:
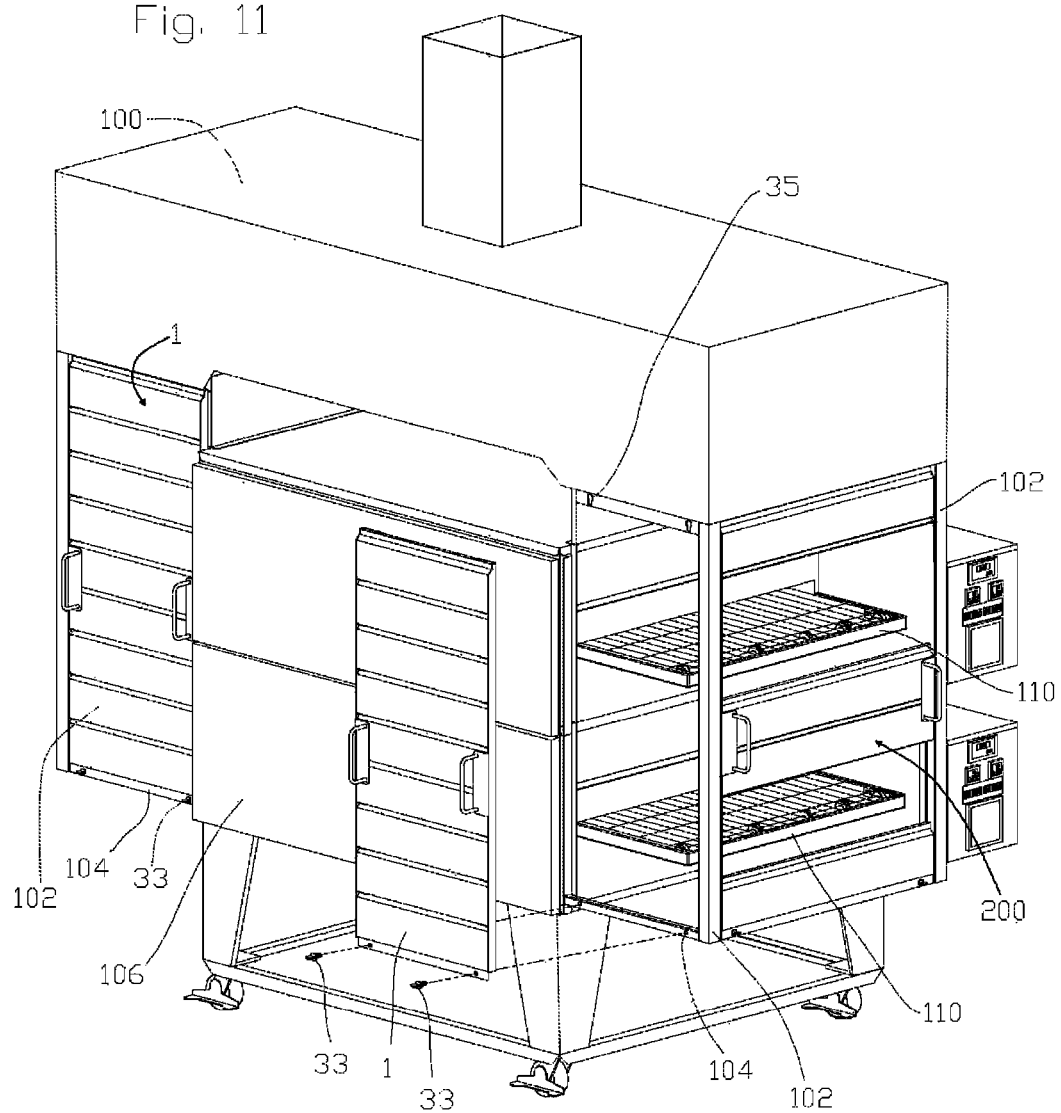
FIG. 11 presents an exemplary use of the instant inventive self cooling panel as a wall component of a commercial oven exhaust hood.

Referring to FIG. 11, the above described heating of panel interior surfaces may, for example, result from the emission of radiant heat and hot cooking gases from commercial conveyor ovens 106. Such ovens 106 may have an associated overlying exhaust hood 100 which is equipped with shroud frames 102, such frame extending downwardly over the ovens' conveyor ends 110. Referring further to FIG. 4, each panel 1 preferably includes a pair of "T" pins 34 which are fixedly attached to mounting plate extensions 23 and 25 at the upper ends of the "L" beams 22 and 24. Such "T" pins 34 may be removably engaged with key hole slots 35 within upper structural members of the shroud frames 102. Correspondingly, thumb screws 33 extending through eyes 32 within lower flanges 30 of the panels 1 may removably mount the lower ends of the panels 1 upon a lower structural member of the shroud frame 102.

A user installing one of the panels 1 upon one of the shroud frames 102 may grasp handles 26 and 28 to lift the panel 1, and may engage the "T" pins 34 with key hole slots 35. Thereafter, the user may release the handles 26 and 28, allowing the panel 1 to hang upon the frame 102 from the slots 35. Thereafter, thumb screws 33 may be extended through eyes 30 within the panel's lower flange 30 for engagement with threaded screw receiving eyes 104.

Referring further to FIG. 11, it may be seen that an exhaust hood shroud end panel 200 is assembled and configured similarly with the side panels 1, with the exception that selected segments of the inner and outer "J" plate series are removed. While such end panels 200 do not convectively draw and conduct cooling air as efficiently as the side panels 1, the end panels 200 structurally benefit from the preferred modular composition of the panels 1. Through removal of selected inner and outer "J" plate pairs within the end panels 200, food passage ports are advantageously formed at positions overlying the conveyors 110. Accordingly, the instant inventive panels are recognizing as multiply functioning for convective panel cooling and for modular configuration and re-configuration.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. A self cooling panel comprising:
   (a) a longitudinally inner wall;
   (b) a longitudinally outer wall comprising a first plurality of "J" plates, each plate among the first plurality of "J" plates having a stem section having an upper end, a lateral end, and an oppositely lateral end, said each plate further having a ported tail section having a lateral end, an oppositely lateral end, and a distal end;
   (c) first attaching means interconnecting the plates among the first plurality of "J" plates so that the upper end of the stem section of each "J" plate among said plurality of "J" plates is positioned at the distal end of the tail section of another plate among said plurality of "J" plates, or so that the distal end of said each "J" plate's tail section is positioned at the upper end of the stem section of another plate among said plurality of "J" plates;
   (d) second attaching means interconnecting the longitudinally inner and outer walls, the second attaching means positioning the upper end of the stem section of each plate among the first plurality of "J" plates longitudinally outwardly from the longitudinally inner wall; and
   (e) lateral and oppositely lateral end caps, the lateral and oppositely lateral end caps comprising apertured "L" beams, and the lateral and oppositely lateral end caps overlying the plates among the first plurality of "J" plates and being respectively positioned at the lateral and oppositely lateral ends of said plates; the first and second attaching means comprising pluralities of screw and eye combinations, and wherein each screw among the pluralities of screw and eye combinations extends through one of the "L" beams' apertures.

2. The self cooling panel of claim 1 wherein the longitudinally inner wall comprises a second plurality of "J" plates, each plate among the second plurality of "J" plates having a stem section and a tail section, said each "J" plate's tail section being ported and extending longitudinally outwardly.

3. The self cooling panel of claim 2 wherein the first attaching means comprises a first plurality of screw receiving eyes, each eye among the first plurality of screw receiving eyes opening at one of the plates among the first plurality of "J" plates and being positioned at said one plate's stem section or tail section.

4. The self cooling panel of claim 3 wherein the second attaching means comprises a second plurality of screw receiving eyes, each eye among the second plurality of screw receiving eyes opening at one of the plates among the second plurality of "J" plates, and being positioned at said one plate's stem section or tail section.

5. The self cooling panel of claim 4 wherein the second attaching means further comprises a plurality of screws, each screw among the plurality of screws extending through at least a pair of eyes among the second plurality of screw receiving eyes.

6. The self cooling panel of claim 5 wherein each screw among the plurality of screws has a longitudinally outer end, and wherein the first attaching means further comprise said longitudinally outer screw ends.

7. The self cooling panel of claim 2 wherein the "J" plates among the second plurality of "J" plates are arranged in a vertical series, said series having an uppermost "J" plate.

8. The self cooling panel of claim 7 further comprising an outlet vent, the outlet vent opening at the uppermost "J" plate's stem section.

9. The self cooling panel of claim 1 wherein each port among the tail sections' ports is laterally oblongated.

10. The self cooling panel of claim 1 wherein each tail section's distal end is configured to present a lower screw mounting land.

11. The self cooling panel of claim 10 wherein each stem section's upper end is configured to present an upper screw mounting land.

12. The self cooling panel of claim 11 wherein each "J" plate's upper and lower screw mounting lands are substantially vertically aligned.

* * * * *